R. F. MACFIE.
SELF PROPELLED VEHICLE.
APPLICATION FILED SEPT. 4, 1917.
1,298,367.
Patented Mar. 25, 1919.
2 SHEETS—SHEET 1.
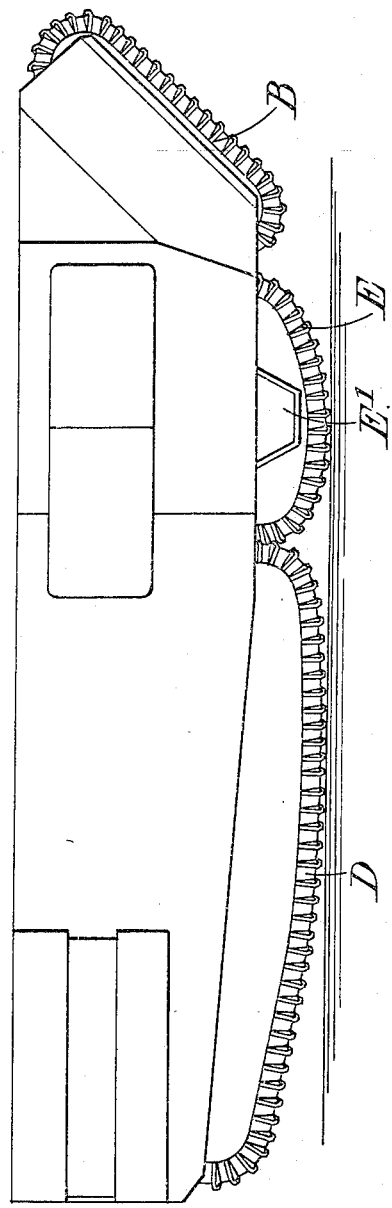

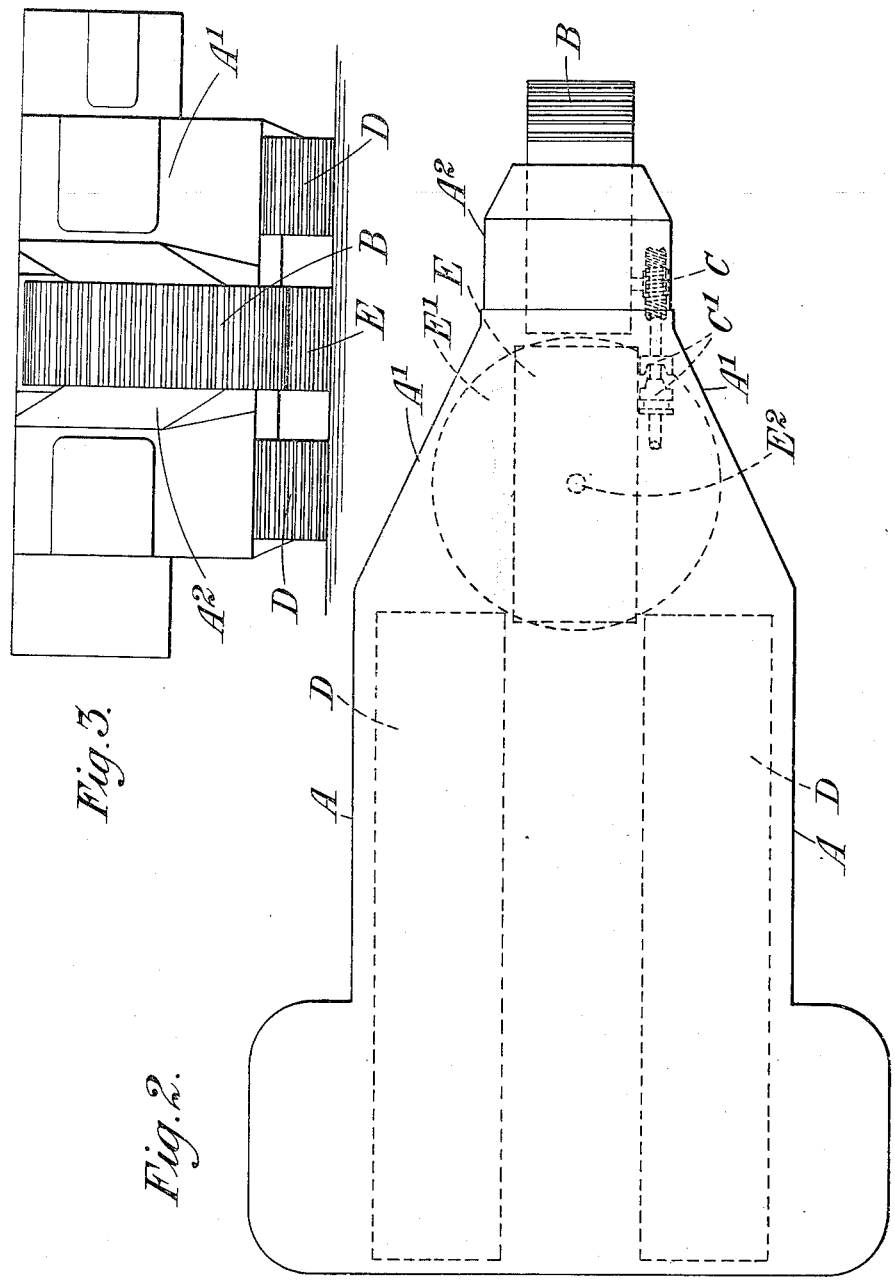

UNITED STATES PATENT OFFICE.

ROBERT FRANCIS MACFIE, OF LONDON, ENGLAND.

SELF-PROPELLED VEHICLE.

1,298,367.　　　　Specification of Letters Patent.　　Patented Mar. 25, 1919.

Application filed September 4, 1917.　Serial No. 189,656.

*To all whom it may concern:*

Be it known that I, ROBERT FRANCIS MACFIE, a citizen of the United States of America, residing in London, England, have invented certain new and useful Improvements in Self-Propelled Vehicles, of which the following is a specification.

This invention is for improvements in or relating to self-propelled vehicles of the type which are adapted to travel across open country or any rough ground and to overcome obstacles which are impassable to the ordinary type of motor vehicle. Such vehicles are usually provided with endless portable tracks or chain-treads as their driving means. It may further be pointed out that such vehicles, when suitably armored, are particularly adapted for military use.

According to this invention there is combined in a self-propelled vehicle, means for ordinary running, and an endless portable track mounted at the front of the vehicle in such a position (for example sloped forwardly and upwardly) as to provide a driving means which can engage a steep bank or like obstacle, with or without means for engaging this track with or disengaging it from the power plant at will.

Preferably endless portable tracks, one on each side of the vehicle, are also employed and a further endless portable track carried by a support pivoted about a vertical axis and situated beyond or near one end of the two side tracks (for example in front of the same) for steering purposes.

In the accompanying drawings, which diagrammatically illustrate one method of carrying out the invention, Figure 1 is a side elevation of the vehicle, Fig. 2 is a plan of the same, and Fig. 3 is a front view of the vehicle.

Like reference letters indicate like parts throughout the drawings.

The vehicle-body may be made up in any desired manner, this in itself constituting no part of the invention, and the vehicle may be armored and provided with machine-guns and other weapons. The frame is preferably constructed to provide two approximately parallel sides A which constitute the middle portion of the vehicle and extending from them are two converging side portions $A^1$ to which is attached a forwardly-projecting frame $A^2$ to support an endless portable track B. This track is forwardly and upwardly inclined, as shown in Fig. 1, and may be driven by worm and worm-wheel C controlled by a dog-clutch $C^1$ to throw it at will into engagement with or out of engagement from the power plant carried by the vehicle. The power plant is not shown as this again in itself constitutes no part of the present invention.

The back portion of the vehicle is carried by two endless portable tracks D which are situated one on each side and parallel with one another and lie within the general outline of the vehicle and their length is made as great as possible; they are also spaced apart transversely of the vehicle to as great an extent as is convenient to afford freedom of movement to a steering track. This steering track E is situated forward of the two tracks D and in line with the space between them. It is carried by a truck $E^1$ which is pivoted at $E^2$ about a vertical axis.

The tracks D and E are arranged to be continuously driven from the power plant carried by the vehicle, means being provided to maintain the drive of the track E when this is being turned to right or left for steering purposes; means may also be provided to increase or decrease the rate of drive of either of the side tracks D to assist in steering if this be desired.

The climbing track B is not ordinarily driven but should the vehicle meet with a steep bank or other obstacle, it can be driven forward until the track B is brought to bear against such obstacle, the latter being at such times thrown into engagement with the power plant by means of the clutch $C^1$ so that it will engage the obstacle and raise the front of the vehicle.

It will be seen that this invention provides a construction of vehicle in which the portable tracks used for normal traveling are used efficiently, since no great part of their active length is wasted by being sloped up to provide a climbing front, but a separate climbing device is provided which need only be rendered operative when the exigencies of the situation demand it. The general arrangement, moreover, renders it more easy to provide effective shields for the portable tracks. The present invention is not concerned with the construction of other features of the vehicle body, but it will be understood that in the case of a military vehicle, as mentioned above, suitable armoring is provided, and provision made for guns or other artillery as may be thought desirable.

It will be appreciated that instead of a single small portable track on the steering truck, it lies within the scope of the invention to provide two such portable tracks on the truck if this construction is more convenient.

What I claim as my invention and desire to secure by Letters Patent is:—

1. In a self-propelled vehicle the combination with the frame and body of supporting and propelling means therefor, an additional portable track at one end of the vehicle disposed in a plane inclined to the plane wherein the said supporting and propelling means are operative, means operatively connecting said portable track to the power unit of the vehicle and means whereby said operative connection can be disengaged.

2. In a self-propelled vehicle the combination with the frame and body of two endless portable tracks normally supporting and propelling the vehicle, a truck pivotally mounted about a vertical axis near an end of the vehicle, a third endless portable track mounted on said truck, means for driving said third portable track, means for rotating said truck and steering the vehicle, a fourth endless portable track at the front of the vehicle mounted in a forwardly and upwardly sloping position, means operatively connecting said portable track to the power unit of the vehicle and means whereby said operative connection can be disengaged.

In testimony whereof I affix my signature.

ROBERT FRANCIS MACFIE.